Figure 1:
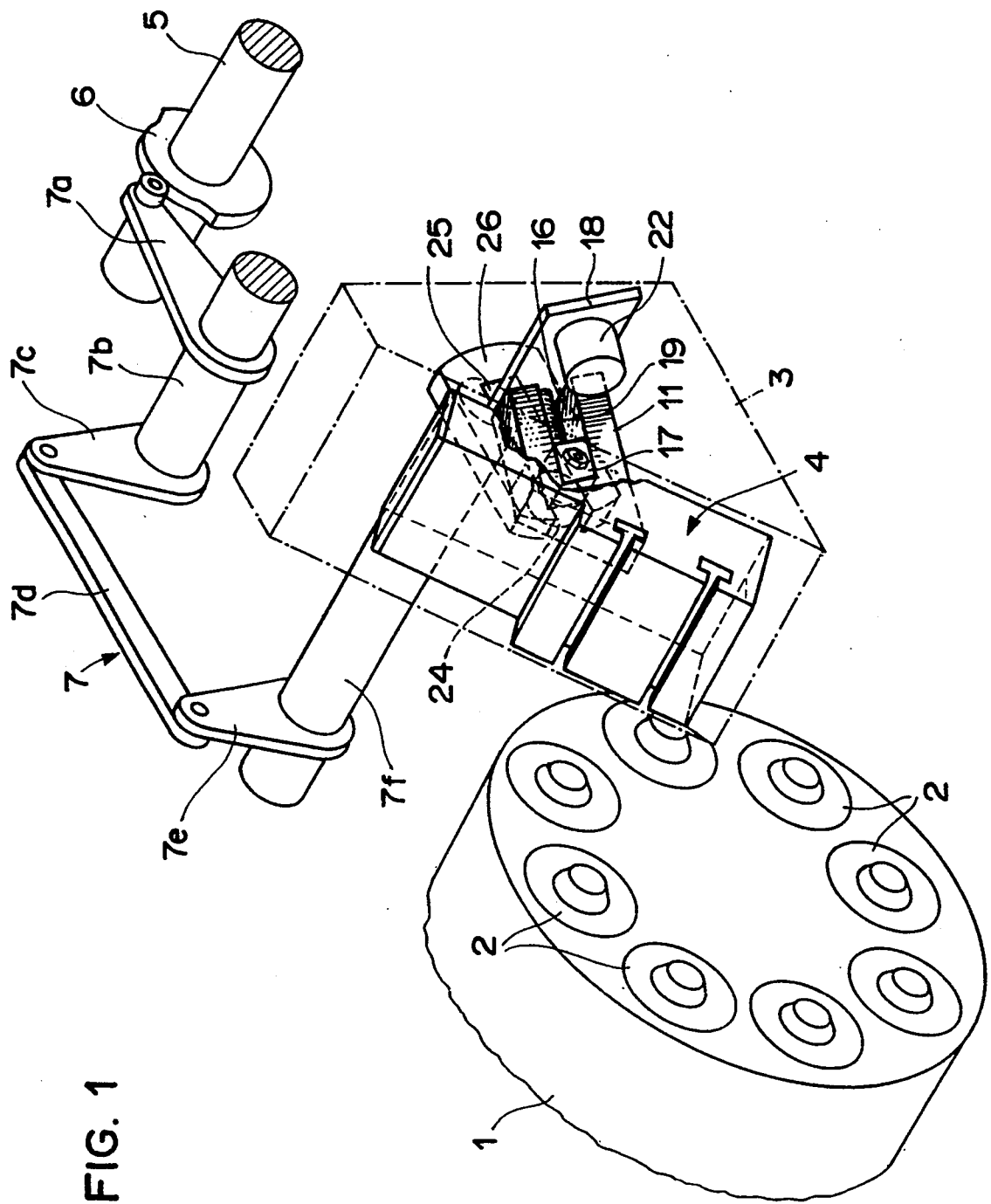

United States Patent [19]

Simonin

[11] Patent Number: 5,349,889
[45] Date of Patent: Sep. 27, 1994

[54] LATHE

[75] Inventor: Jean C. Simonin, Moutier, Switzerland

[73] Assignee: Tornos-Bechler SA, Moutier, Switzerland

[21] Appl. No.: 857,971

[22] Filed: Mar. 26, 1992

[30] Foreign Application Priority Data

Mar. 28, 1991 [CH] Switzerland ............... 952/91

[51] Int. Cl.⁵ ............................ B23B 21/00
[52] U.S. Cl. ........................ 82/118; 29/38 B; 82/134; 82/137
[58] Field of Search ............ 29/37 R, 38 A, 38 B; 82/124, 118, 127, 133, 134, 137, 138, 154, 11.2, 11.3

[56] References Cited

U.S. PATENT DOCUMENTS

| | | | |
|---|---|---|---|
| 2,487,243 | 11/1949 | Horvath | 29/57 |
| 2,610,550 | 9/1952 | Touchman | 90/11 |
| 3,245,290 | 4/1966 | Johansson | 82/133 X |
| 3,688,612 | 9/1972 | Haruta et al. | 82/134 |
| 3,978,745 | 9/1976 | Okamoto | 82/124 X |

FOREIGN PATENT DOCUMENTS 1043016 11/1958 Fed. Rep. of Germany.
2603826 3/1988 France.

*Primary Examiner*—Z. R. Bilinsky
*Attorney, Agent, or Firm*—Oliff & Berridge

[57] ABSTRACT

A slide (4) made up of a table (8) and a base (11) is actuated radially relative to a workpiece (M) to be machined via a stud (17) adjustable in a slot (16). The position of the stud can be regulated by means of a screw and a motor. A roller (24) borne by the stud then moves along another slot (25) in an arm (26) integral with a shaft (7f). The oscillations of the shaft are controlled by a control cam. Displacement of the stud relative to the pivot point of the arm permits the transmission ratio, hence the course of travel of the slide, to be varied. The angle α between the directions of the slots is other than zero at the end of the travel, so that the final position of a tool (29) can be adjusted by means of the control motor.

9 Claims, 4 Drawing Sheets

LATHE

This invention relates to machine tools, and more particularly to a lathe of the type having at least one spindle, at least one slide movable on a support toward or parallel to the axis of the spindle, and at least one transmission mechanism actuated by a control means which determines the course of travel of the slide.

In lathes of this kind, the control means is usually a cam. However, this cam may be replaced by a jack or an analogous device.

Electronic control devices are known to have made it possible to improve the operation of cam lathes by simplifying and accelerating the so-called start-up operations with a view to machining a series of parts of a predetermined type. Thus, devices called electronic verniers have been proposed for adjusting the final position of the tool mounted on a slide automatically and as a function of a program. Consequently, it is possible to take into account the degree of any wear on the tool and the relative positions of the various transmission elements.

It is an object of this invention to provide an improved lathe which operates more efficiently by introducing into the transmission mechanism a motorized control that facilitates and accelerates the starting-up operations to be carried out with a view to producing a series of parts of a predetermined type.

A further object of this invention is to provide such a lathe which also allows fine adjustment of the final position of the tool by means of the same elements, if need be.

To this end, in the lathe according to the present invention, of the type initially mentioned, the transmission mechanism comprises a transmission element, the transmission ratio of which is adjustable and is controlled by a programmable motor.

Figure 2:
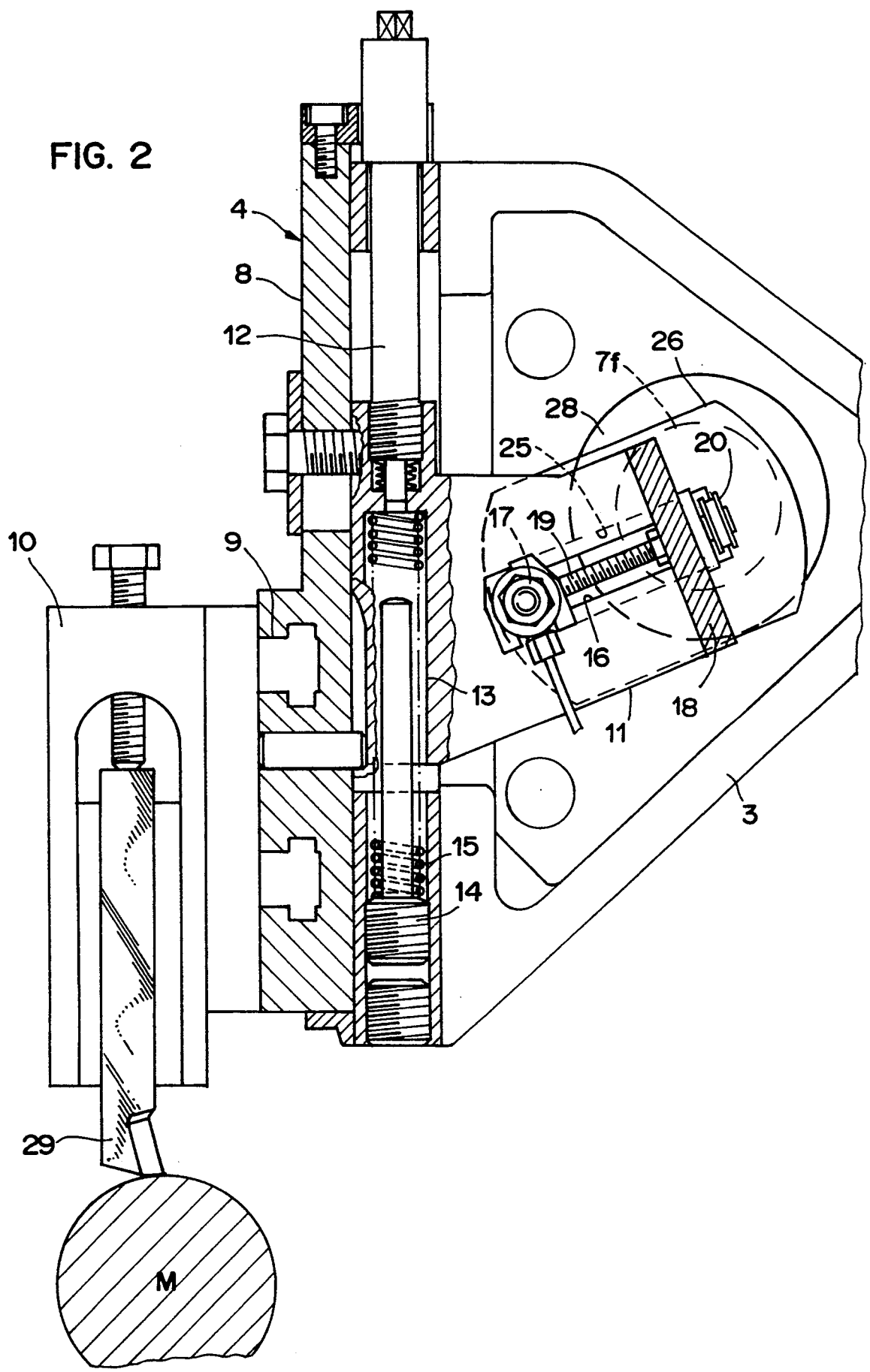
Figure 3:
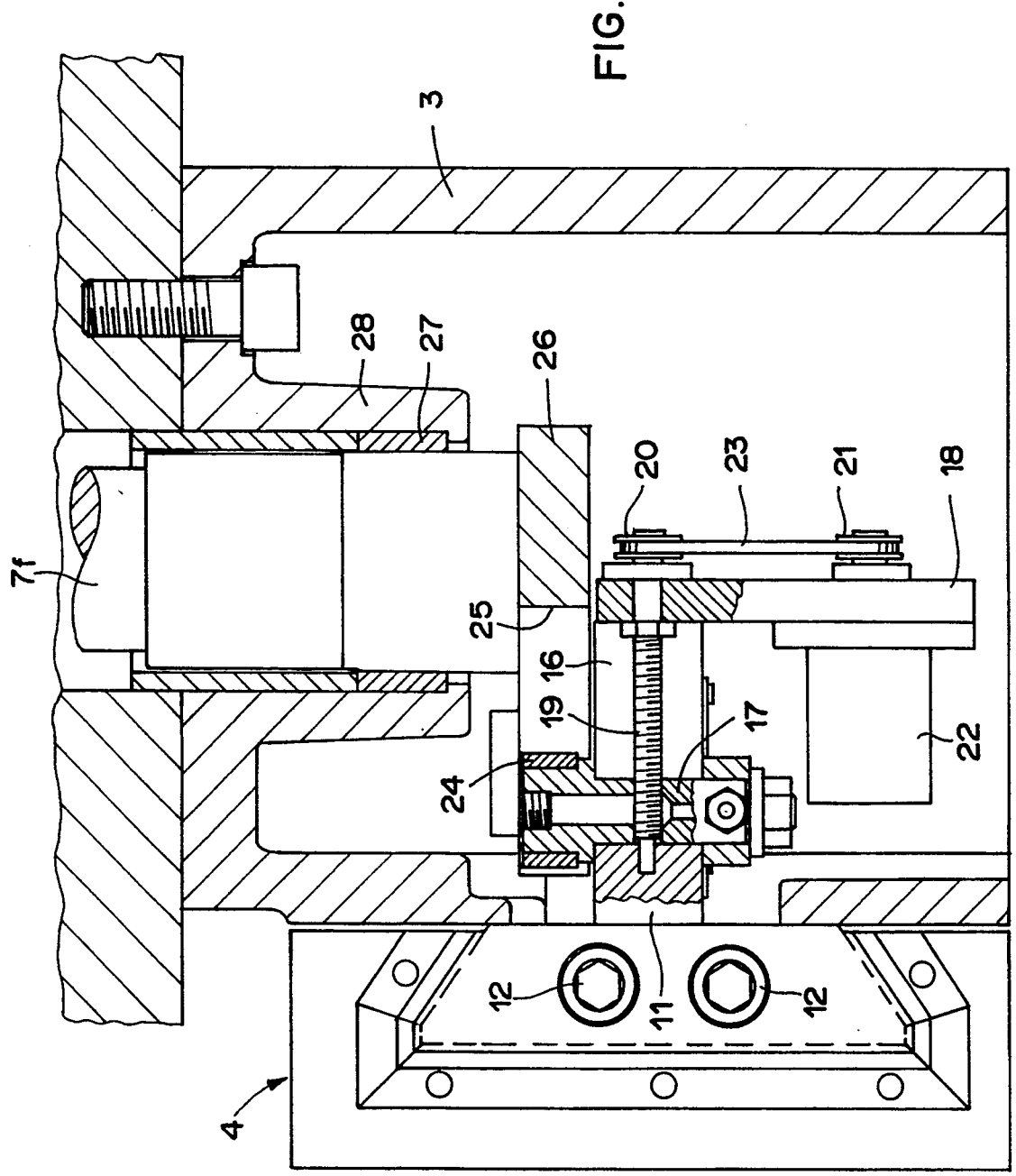
Figure 4:
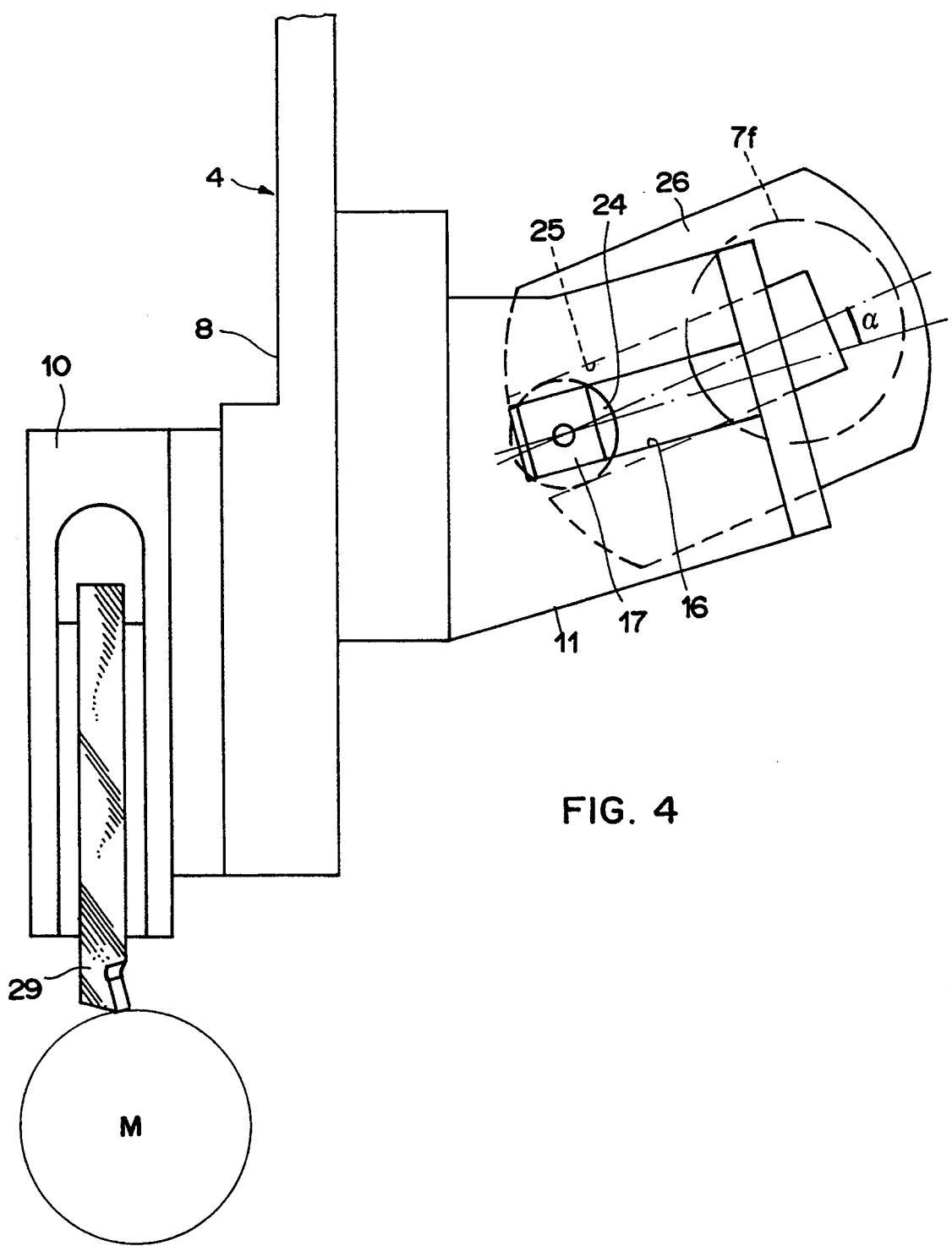

A preferred embodiment of the invention will now be described in detail with reference to the accompanying drawings, in which:

FIG. 1 is a partial, diagrammatic perspective view of certain elements of a multi-spindle lathe in the preferred embodiment, FIG. 2 is an elevation, partially in section, of part of the lathe of FIG. 1, viewed in the direction of the axis of the spindle, FIG. 3 is a top plan view, likewise partially in section, of the elements shown in FIG. 2, and FIG. 4 is a diagrammatic elevation analogous to FIG. 2 for explaining the adjustment of the final position of the tool.

Although the improvement contributed by the present invention is explained below in relation to a multi-spindle lathe, it will be understood that this improvement might equally well be applied to a single-spindle lathe.

The multi-spindle lathe illustrated in the drawing comprises a barrel 1 which can be indexed by means known per se, through step-by-step rotation about its longitudinal axis, and which bears eight spindles 2. Barrel 1 may instead have four, five, or six spindles 2 according to the type of machine. Each of the spindles 2 is arranged to guide a piece of bar stock, a blank, or other workpiece to be machined, and the lathe comprises on its fixed base a series of supports 3, one of which is shown in FIG. 1. Each of these supports bears a slide 4 designed to receive a tool holder (not shown in FIG. 1) which in turn bears a cutting tool capable of co-operating with the workpiece guided by one of the spindles 2.

Co-operating with each support 3 is a camshaft 5 bearing a cam 6 arranged to guide a transmission mechanism 7 actuating slide 4. In the diagrammatic view of FIG. 1, transmission mechanism 7 comprises a follower lever 7a integral with a first shaft 7b which in turn bears a link mechanism lever 7c linked to a connecting rod 7d driving a slide lever 7e integral with a second shaft 7f.

Mechanisms of this kind form part of the prior art; and if it is desired to use a cam having a standard throw as cam 6, the ratio of transmission mechanism 7 must be adjustable as a function of the workpiece.

As will be seen below with reference to FIGS. 2, 3, and 4, the mechanism 7 shown diagrammatically in FIG. 1 includes an adjustable-ratio arrangement such that the adjustment data can be stored in a program for carrying out the sequence of operations.

FIGS. 2 and 3 show, in elevation and in a top plan view partially in section, support 3, slide 4, and certain elements of transmission mechanism 7. As may be seen in FIG. 2, slide 4 is composed mainly of a table 8 provided with grooves 9 in which a tool holder 10 may be secured and of a base 11 to which table 8 may be secured in a precisely fitted position. Base 11 co-operates with slide 4, the latter being limited in forward position by a stop 12. A pair of sockets 13 co-operate with rods 14 fixed relative to support 3, and with springs 15 which tend to push slide 4 into its position remote from the axis of the spindle.

Base 11 extends laterally into a hollow in support 3 and includes a longitudinal slot 16 provided with grooves or notches (not shown) so as to be able to guide a stud 17 translationally. Fixed to the outer end of base 11 is a plate 18 which closes slot 16 and includes a hole in which a screw 19 is precisely ball-bearing guided, the end pivot thereof being fitted in a blind hole in the bottom of slot 16. The outer end of ball-bearing-guided screw 19 bears a pulley 20 co-operating with a similar pulley 21 mounted at the end of the output shaft of a stepping motor 22, the stator of which is secured to plate 18. Via a belt 23, which may be of the notched type, screw 19 is driven rotatingly by motor 22, which may, for example, be a stepping motor making two hundred steps per revolution, the transmission ratio between output shaft 21 and screw 19 being 1:1. The thread of screw 19 engages a thread of stud 17, so that the rotation of motor 22 causes stud 17 to move in slot 16.

The end of stud 17 takes the form of a cylindrical bearing surface on which a roller 24 (FIG. 3) is mounted. Roller 24 is fitted in a parallel-sided slot 25 in an arm 26 extending radially relative to the axis of shaft 7f. As shown in FIG. 3, the end of shaft 7f pivots in a bearing 27 mounted in a bushing 28 integral with support 3, and arm 26 takes the form of an elongated plate fixed radically to the end of shaft 7f, this assembly permitting the position of stud 17 to be varied in slot 16. Thus, the oscillations of shaft 7f controlled by cam 6 are transmitted to arm 26 and, via this arm and roller 24, to stud 17 so that base 11 and table 8, which together form slide 4, move translationally on support 3 along a course dependent upon the amplitude of the oscillations of shaft 7f.

As the position of stud 17 within slot 16 can be controlled by motor 22, which is itself a programmable motor, it will be seen that the distance travelled by slide 4 is automatically adjustable during the course of a program stored in a control device capable of acting particularly on motor 22. Thus, starting from a cam 6 having a standard throw, the travel of a tool, such as cutting tool 29 fixed to tool holder 10 and acting upon a workpiece M, can be adjusted at will.

However, as further shown by FIG. 4, the device described makes it possible to carry out another adjustment by means of the same motor 22, thus additionally simplifying use of the lathe. FIG. 4 illustrates, still more diagrammatically, the position of tool 29 relative to workpiece M to be machined when tool 29 reaches the minimum required machining diameter. In this position, the direction of slot 25 forms an angle designated α in FIG. 4 with the direction of slot 16. The relative dimensions of the various elements of transmission mechanism 7 are chosen accordingly. Owing to this angle α, any movement imposed upon stud 17 by motor 22 when arm 26 is fixed has the effect of slightly modifying the position of slide 4, and consequently that of tool 29. However, the extent of this movement is very slight if angle α itself is small, and tests have shown that with an angle on the order of 7°, the desired result is obtained. A relatively great movement of stud 17 in slot 16 has the effect of appreciably modifying the total course of travel of slide 4, whereas a small movement results in a fine adjustment of the final position of tool 29 with respect to the axis of the spindle with which that tool co-operates.

Instead of a stepping motor, a motor of some other type might be provided as the control means, e.g., a hydraulic motor or jack, as the case may be. Such means may easily be controlled on the basis of stored data.

Although the arrangement described above is one in which the final position of the tool and the travel of the slide are adjustable by means of the same motor, motor 22 in another embodiment might also be used solely for adjusting the transmission ratio, hence the length of the course travelled, with other means being provided for the positioning of the tool.

What is claimed is:

1. A lathe of the type having at least one support, at least one spindle, at least one slide movable on said support relative to a longitudinal axis of said spindle, control means for determining the travel of said slide, and at least one transmission mechanism actuated by said control means, comprising:
    a programmable motor having a rotor and a stator,
    a first transmission element forming part of said transmission mechanism and having an adjustable transmission ratio controlled by said motor; and
    a shaft oscillated by said control means about a longitudinal axis of said shaft, wherein said first transmission element is a radial arm integral at one end thereof with said shaft, the active length of said arm being variable and controlled by said motor.

2. The lathe of claim 1, wherein said arm includes a first slot, further comprising a roller movably disposed in said first slot, a stud supporting said roller, and a second transmission element forming part of said transmission mechanism and including a second slot, said stud being slidingly disposed in said second slot.

3. The lathe of claim 2, wherein said second transmission element is a base integral with said slide.

4. The lathe of claim 3, further comprising a translation screw mounted in said base and connected to said rotor, said stud being associated with said screw, and said stator being borne by said base.

5. The lathe of claim 4, further comprising means disposed on said slide for carrying out a fine adjustment of the final position of a tool borne by said slide independently of the position of said transmission mechanism.

6. The lathe of claim 4, wherein said transmission mechanism is so arranged that in the final position of a tool borne by said slide, the axis of said screw and the axis of said first slot form an angle other than zero.

7. The lathe of claim 6, wherein said angle is of about 7°.

8. The lathe of claim 1, wherein said motor is a stepping motor.

9. The lathe of claim 1, wherein said control means is a cam, further comprising means for driving said cam rotatingly.

* * * * *